(12) United States Patent
Lim et al.

(10) Patent No.: US 8,683,238 B2
(45) Date of Patent: Mar. 25, 2014

(54) MOBILE SYSTEM ON CHIP (SOC) AND A MOBILE TERMINAL INCLUDING THE MOBILE SOC

(75) Inventors: Eui Cheol Lim, Hwasung-si (KR); Jae Sop Kong, Gwacheon-si (KR); Ho Kyung Kwon, Yongin-si (KR); Gab Joo Lim, Yongin-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 13/423,555

(22) Filed: Mar. 19, 2012

(65) Prior Publication Data

US 2012/0191991 A1    Jul. 26, 2012

Related U.S. Application Data

(62) Division of application No. 12/612,286, filed on Nov. 4, 2009, now Pat. No. 8,171,316.

(30) Foreign Application Priority Data

Nov. 5, 2008  (KR) .......................... 10-2008-0109500

(51) Int. Cl.
*G06F 1/00* (2006.01)
*G06F 1/26* (2006.01)
*G06F 3/00* (2006.01)
*G06F 13/36* (2006.01)

(52) U.S. Cl.
USPC ............. 713/300; 713/320; 713/324; 710/52; 710/310

(58) Field of Classification Search
USPC ...................... 713/300, 320, 324; 710/52, 310
See application file for complete search history.

(56) References Cited

U.S. PATENT DOCUMENTS

| | | | | |
|---|---|---|---|---|
| 6,928,039 | B2 * | 8/2005 | Millikan et al. | 369/47.33 |
| 6,968,468 | B2 * | 11/2005 | Lam | 713/320 |
| 7,778,838 | B2 * | 8/2010 | Sebastian et al. | 704/500 |
| 7,809,252 | B2 * | 10/2010 | Lai et al. | 386/353 |
| 7,869,316 | B2 * | 1/2011 | Van Gassel | 369/47.33 |
| 7,953,300 | B2 * | 5/2011 | Tsuchida et al. | 382/305 |

* cited by examiner

*Primary Examiner* — Stefan Stoynov
(74) *Attorney, Agent, or Firm* — F. Chau & Associates, LLC

(57) ABSTRACT

A mobile System on Chip (SoC) including a central processing unit (CPU) and an audio out module that includes a buffer and an audio interface. A power mode of the audio out module is controlled separately from a power mode of the mobile SoC so that the audio out module operates when the mobile SoC is in a power down mode.

1 Claim, 8 Drawing Sheets

MOBILE SYSTEM ON CHIP (SOC) AND A MOBILE TERMINAL INCLUDING THE MOBILE SOC

CROSS-REFERENCE TO RELATED APPLICATIONS

This application is a Divisional of U.S. application Ser. No. 12/612,286 filed on Nov. 4, 2009 now U.S. Pat. No. 8,171,316, which claims priority to Korean Patent Application 10-2008-0109500, filed on Nov. 5, 2008, in the Korean Intellectual Property Office, the disclosures of which are incorporated by reference herein in their entireties.

BACKGROUND

1. Technical Field

The present inventive concept relates to a mobile System on Chip (SoC), and more particularly, to a mobile SoC that allows minimum power to be consumed in a mobile terminal capable of playing back audio, and a mobile terminal including the mobile SoC.

2. Discussion of the Related Art

Mobile central processing units (CPUs) are designed to save power. Mobile CPUs are found in mobile computers, mobile phones and digital audio players, for example. A mobile CPU may be integrated with other components into a single chip to have an SoC form.

When sound sources such as an MP3 file are played, mobile SoCs reduce power consumption by lowering the frequency of a clock signal to a minimum frequency required for the play, for example. However, as more components are integrated into a mobile SoC to provide more functions, the mobile SoC increases in size, and thus power consumption due to a leakage current may increase even though the clock frequency is stepped down under low processor loads.

Accordingly, there exists a need to reduce power consumption in a mobile SoC.

SUMMARY

An exemplary embodiment of the present inventive concept provides a mobile System on Chip (SoC) that allows power to be supplied to audio output logics included in the mobile SoC while the rest of the mobile SoC is powered down, thereby reducing power consumption. An exemplary embodiment of the present inventive concept also provides a mobile terminal that includes the mobile SoC and that allows memory resources included in the audio output logics to be used by other components of the mobile terminal, thereby contributing to efficient resource usage.

According to an exemplary embodiment of the present inventive concept, there is provided a mobile SoC including a central processing unit (CPU), and an audio out module. The audio out module includes a buffer and an audio interface. A power mode of the audio out module is controlled separately from a power mode of the mobile SoC so that the audio out module operates when the mobile SoC is in a power down mode. When audio information received from the CPU is stored in the buffer, the mobile SoC may enter into the power down mode, and the audio interface of the audio out module may sequentially receive the audio information from the buffer and output the audio information to an audio codec. When audio information remaining in the buffer is less than or equal to a preset reference value, the audio out module may wake up the mobile SoC, and the CPU of the awakened mobile SoC may output next audio information to the buffer. The audio information is directly received from the CPU.

According to an exemplary embodiment of the present inventive concept, there is provided a mobile terminal including a sound source storage device storing audio information; a memory device receiving the audio information from the sound source storage device; and a mobile SoC including a CPU and an audio out module including a first buffer and an audio interface. The CPU decodes the audio information received from the memory device and stores the decoded audio information in a second buffer of the memory device. The decoded audio information stored in the second buffer is stored in the first buffer, and the decoded audio information stored in the second buffer is output to an audio codec via the audio interface when the mobile SoC is powered down.

A size of the second buffer is greater than or equal to a size of the first buffer.

After the first buffer is used by a module of the mobile SoC other than the audio out module, an address, data, or both the address and the data of the first buffer is/are shuffled when the audio out module is used. The audio interface is operable in a master mode or a slave mode. When the other module uses the first buffer, the audio interface provides information about a final address read out by the audio interface to a direct memory access (DMA) device and may be set to the slave mode, the DMA device enables decoded audio information starting from a location of the second buffer next to a location of the second buffer corresponding to the final address to be transmitted and the audio interface may receive and output the decoded audio information to the audio codec.

When the audio out module uses the first buffer, data stored in the second buffer may be transmitted to the first buffer, and the audio interface may be set to the master mode and receive the data transmitted to the first buffer. The mobile terminal may further include a third buffer storing acoustic information; and a mixer mixing the acoustic information stored in the third buffer with information stored in the first buffer. A clock signal of the audio out module is asynchronous with a clock signal of the mobile SoC, and a clock tree of the audio out module is constructed separately from a clock tree of the mobile SoC.

The clock signal of the audio out module is synchronized with a clock signal of the audio codec.

According to an exemplary embodiment of the present inventive concept, a method of audio playback in a mobile terminal including a mobile SoC, comprises: waking up the mobile SoC in response to data remaining in an audio buffer of an audio out module of the mobile SoC being less than or equal to a reference value; copying data in a memory buffer of a memory device of the mobile SoC to the audio buffer; decoding data stored in a cache of a CPU of the mobile SoC and writing the decoded data to the memory buffer; loading data stored in a file buffer of the memory device to another cache of the CPU; loading new data from a sound source storage device of the mobile terminal to the file buffer; powering down the components of the mobile SoC except the audio out module in response to the completion of the loading of new data; and operating the audio out module to provide audio playback while the other components of the mobile SoC are powered down.

The data loaded from the sound source storage device includes an MP3 file.

The data copied from the memory buffer completely fills the audio buffer to increase an amount of time the audio out module can operate while the other components of the mobile SoC are powered down.

BRIEF DESCRIPTION OF THE DRAWINGS

The above and other features of the present inventive concept will become more apparent by describing in detail exemplary embodiments thereof with reference to the accompanying drawings in which.

DETAILED DESCRIPTION OF THE EMBODIMENTS

Figure 1:
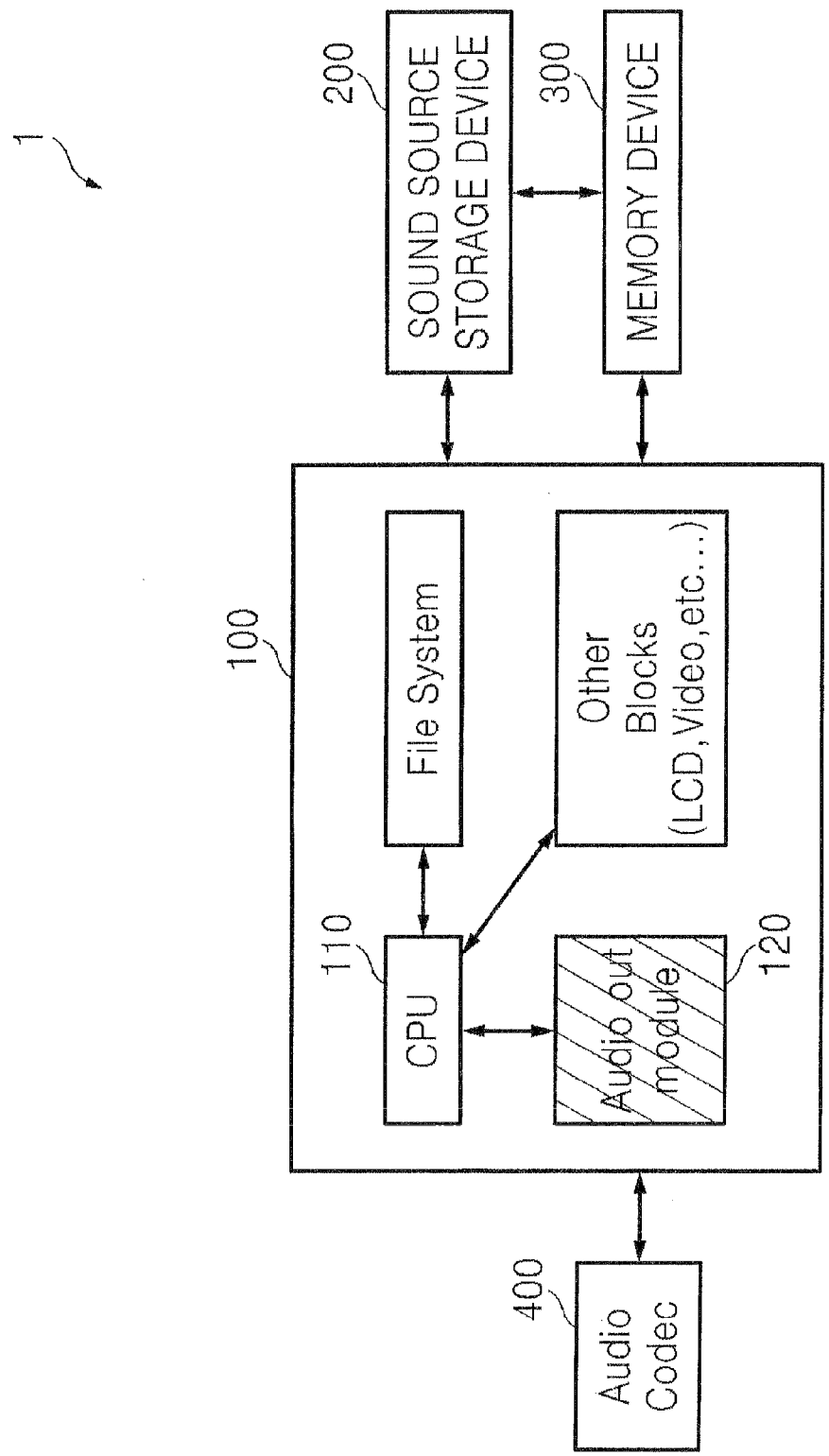
FIG. 1 is a block diagram of a mobile terminal according to an exemplary embodiment of the present inventive concept.

FIG. 1 is a block diagram of a mobile terminal 1 according to an exemplary embodiment of the present inventive concept. Referring to FIG. 1, the mobile terminal 1 may include a mobile System on Chip (SoC) 100, a sound source storage device 200, a memory device 300, and an audio codec 400. The mobile SoC 100 includes a central processing unit (CPU) 110 and an audio out module 120. The mobile SoC 100 may further include a file system or various blocks/modules for enabling various other functions to be provided by the mobile terminal 1. For example, the mobile SoC 100 may further include a liquid crystal display (LCD) module or a video module.

The CPU 110 performs arithmetic operations necessary to drive the mobile terminal 1. For convenience of explanation, the CPU 110 will now be described by focusing on its function of decoding sound source information (audio information), for example, MP3 files, to perform audio reproduction.

The audio out module 120 may be constructed with a single logic block for implementing an exemplary embodiment of the present inventive concept. The audio out module 120 may interface data (for example, decoded sound source information) received from the CPU 110 according to a predetermined standard so that the data may be recognized by the audio codec 400. For example, the audio out module 120 may include an IIS interface. IIS also referred to as I2S stands for Inter-IC Sound. The audio out module 120 includes a relatively large memory buffer (for example, 128 KB) by which an exemplary embodiment of the present inventive concept may be implemented. Detailed operations of the audio out module 120 will be described later.

According to an exemplary embodiment of the present inventive concept, power supply of the audio out module 120 may be controlled independently from power supply of the mobile SoC 100. In other words, although the audio out module 120 is included in the mobile SoC 100, a power mode for the audio out module 120 is independently controlled. Accordingly, according to an exemplary embodiment of the present inventive concept, the mobile SoC 100 may be designed so that, in an audio playback mode for low-power consumption (hereinafter, a low-power audio playback mode), the audio out module 120 may operate even when the other components of the mobile SoC 100 enter into a power down mode. The power down mode may denote a state in which supply of a clock signal and power to a specific component is stopped.

The sound source storage device 200 may denote a large-capacity storage device of the mobile terminal 1, in which audio information (sound source information) is stored. For example, the sound source storage device 200 may be implemented as a NAND flash memory device. The memory device 300 may receive and temporarily store the audio information from the sound source storage device 200 and output the stored audio information to the CPU 110. In an exemplary embodiment, the audio information decoded by the CPU 110 may be either directly output to the audio out module 120 or output to the audio out module 120 via the memory device 300. For example, the memory device 300 may be implemented as a dynamic random access memory (DRAM). The audio codec 400 may change data output from the audio out module 120 to an analog acoustic signal and output the analog acoustic signal.

Figure 2:
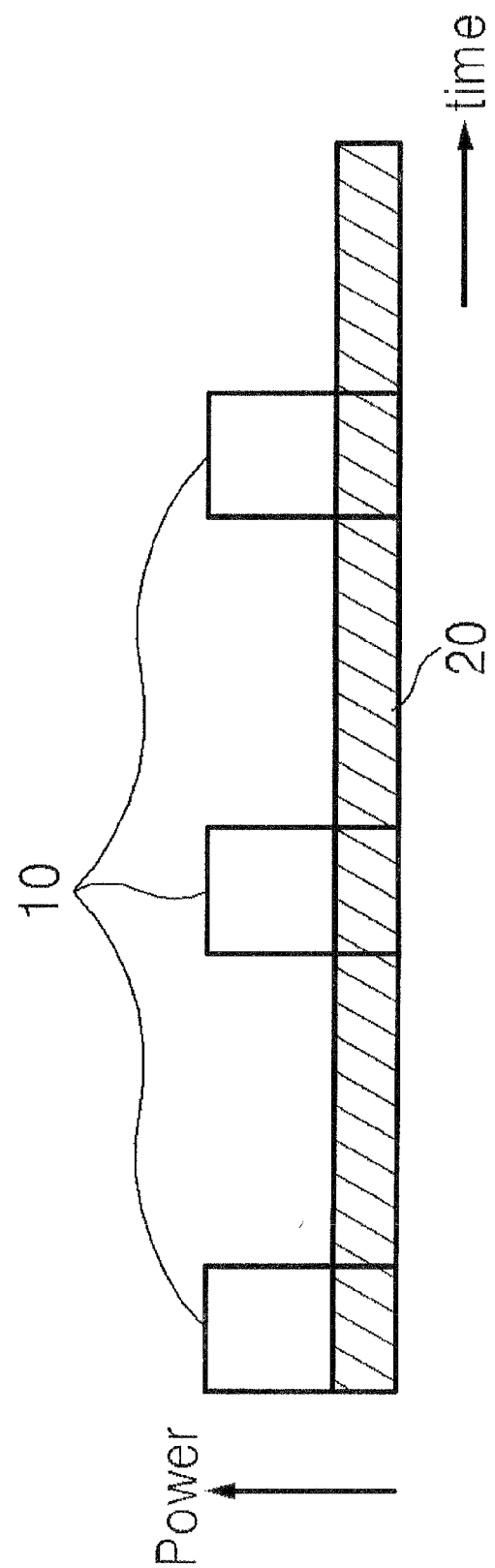
FIG. 2 is a diagram illustrating power consumption that occurs during audio playback of a mobile System on Chip (SoC) included in the mobile terminal illustrated in FIG. 1, according to an exemplary embodiment of the present inventive concept.

FIG. 2 is a diagram illustrating power consumption that occurs during audio playback of the mobile SoC 100, according to an exemplary embodiment of the present inventive concept. Referring to FIG. 2, in periods 10 when large power is consumed during audio playback, power is supplied to the entire mobile SoC 100. However, in period 20 when audio is played back, the audio out module 120 operates.

As illustrated in FIG. 2, although the audio out module 120 operates in the period 20 when audio is played back, power consumption during the period 20 except when it overlaps the periods 10 is relatively small. In the periods 10, power consumption is relatively large, whereas the length of each of the periods 10 is short.

In other words, in the present exemplary embodiment, power is independently supplied to the mobile SoC 100 and the audio out module 120, so that during audio playback, only the audio out module 120 is supplied with power when the other components of the mobile SoC 100 enter into a power down mode, thereby reducing power consumption. Control of power for the mobile SoC 100 and/or the audio out module 120 may be performed by a power controller (not shown).

Figure 3:
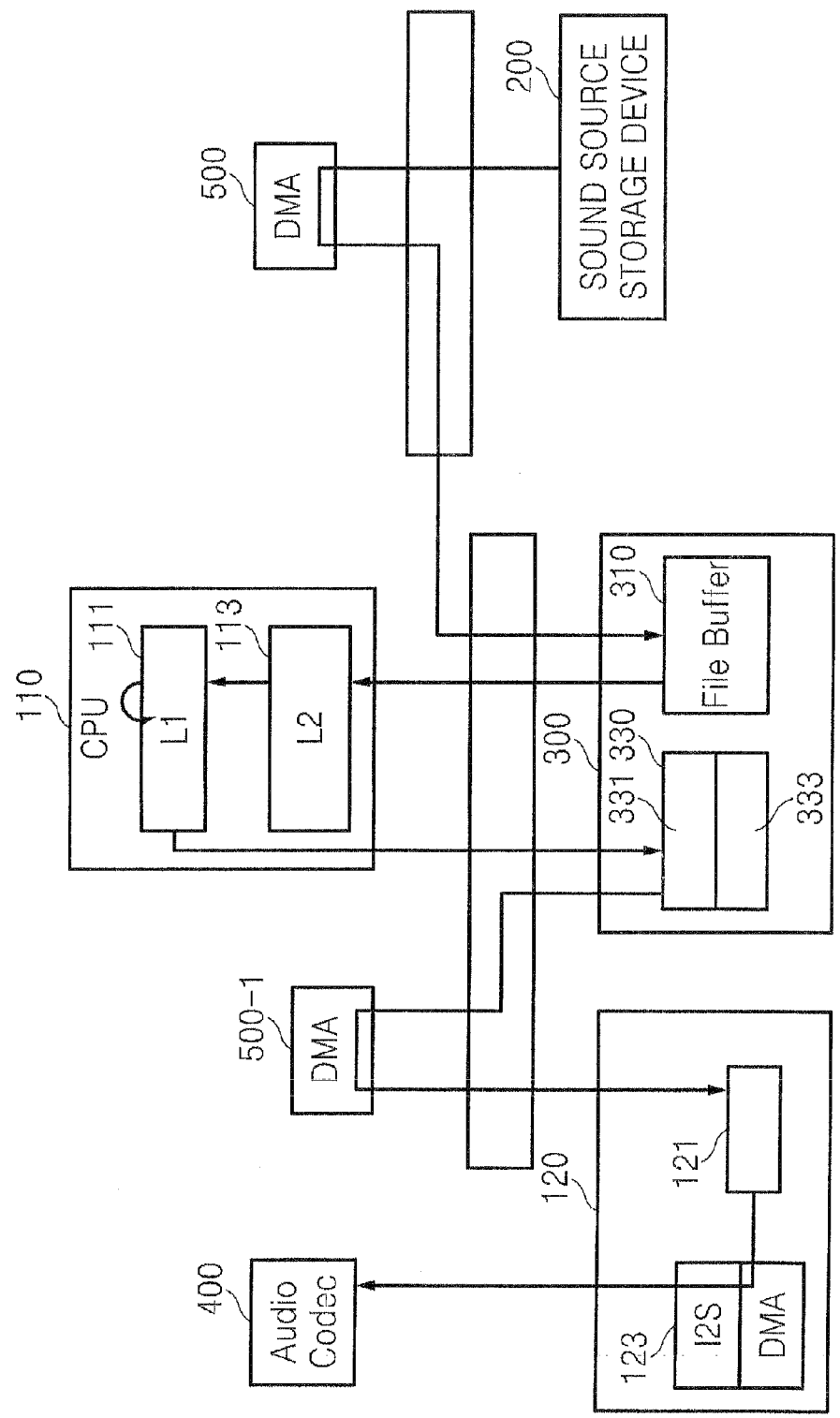
FIG. 3 illustrates an audio data flow in the mobile terminal illustrated in FIG. 1.

FIG. 3 illustrates an audio data flow in the mobile terminal 1 illustrated in FIG. 1. Referring to FIG. 3, audio information (for example, an MP3 stream file) stored in the sound source storage device 200 may be transmitted to a file buffer 310 of the memory device 300. The memory device 300 may be used as a main memory of the mobile terminal 1. The audio information may be transmitted by a first direct memory access (DMA) 500 from the sound source storage device 200 to the file buffer 310.

At least a part of the audio information stored in the file buffer 310 may be preloaded in an L2 cache 113 of the CPU 110. The audio information preloaded in the L2 cache 113 may be loaded in an L1 cache 111 of the CPU 110, and the CPU 110 may parse and decode the audio information loaded in the L1 cache 111.

In an exemplary embodiment of the present inventive concept, as illustrated in FIG. 3, the decoded audio information may be stored in a memory buffer 330 of the memory device 300 and transmitted to an audio buffer 121 of the audio out module 120 by a second DMA 500-1. In an exemplary embodiment of the present inventive concept, the decoded audio information may be transmitted from the CPU 110 directly to the audio buffer 121. The second DMA 500-1 may be integrally formed with the first DMA 500 or may be formed independently from the first DMA 500.

First, in the case where the decoded audio information is transmitted from the CPU 110 directly to the audio buffer 121, the memory device 300 may not include the file buffer 310. When the CPU 110 writes the decoded audio information until the size (for example, 128 KB) of the audio buffer 121 is completely filled, the mobile SoC 100 may enter into the power down mode and only the audio out module 120 may continue operating.

Data written to the audio buffer 121 may be interfaced to data corresponding to the audio codec 400 via an audio interface 123 and thus may be output to the audio codec 400. The data written to the audio buffer 121 may be output to the audio codec 400 according to a First In First Out (FIFO) method.

When data remaining in the audio buffer 121 after the output of the data to the audio codec 400 is less than or equal to a reference value, the audio out module 120 or a power controller (not shown) may awaken the mobile SoC 100. According to an exemplary embodiment, the reference value may be 100% of the audio buffer 121 (in other words, when the audio buffer 121 is empty) or 30% of the audio buffer 121 (in other words, when the audio buffer 121 is 30% empty). When the mobile SoC 100 wakes up, the CPU 110 may write the decoded audio information (for example, the MP3 stream) to an empty space of the audio buffer 121.

In an exemplary embodiment of the present inventive concept, the decoded audio information obtained by the CPU 110 may be stored in the memory buffer 330 of the memory device 300 and then transmitted to the audio buffer 121 by the second DMA 500-1. This is so, because if the CPU 110 does not directly write the decoded audio information to the audio buffer 121, the audio buffer 121 may be used not only by the audio out module 120 but also by the other blocks or other modules (for example, a camera module, an LCD module, etc.). A reason why the audio buffer 121 is shared by the audio out module 120 and the other modules is that a buffer for temporarily storing audio information in a general mobile terminal has a small capacity (for example, 4 KB), whereas the audio buffer 121 according to the current exemplary embodiment has a relatively large capacity (for example, 128 KB). A reason why the audio buffer 121 has a large capacity is that if the audio buffer 121 has a small capacity, the audio out module 120 needs to wake the mobile SoC 100 up frequently, and thus reduction of power consumption may be hindered. Therefore, it may be inefficient for only the audio out module 120 to use the audio buffer 121 which has a large capacity.

The case where the decoded audio information obtained by the CPU 110 is stored in the memory buffer 330 of the memory device 300 and transmitted to the audio buffer 121 by the second DMA 500-1 will now be described. The operational principle of the case where the decoded audio information is transmitted from the CPU 110 directly to the audio buffer 121 may be inferred from the following description.

Referring to FIG. 3, operations in which the CPU 110 parses and decodes the audio information loaded in the L1 cache 111 may be similar to those described above. The CPU 110 may write the decoded audio information to the memory buffer 330. The memory buffer 330 may be a double buffer including buffers 331 and 333. The buffer 331, the buffer 333, or both of them may have the same size as that of the audio buffer 121.

When the CPU 110 completes writing decoded audio information to one buffer (for example, the buffer 331) of the memory buffer 330, the second DMA 500-1 may transmit the decoded audio information written to the buffer (for example, the buffer 331) to the audio buffer 121. The audio interface 123 may sequentially receive and interface the data stored in the audio buffer 121 and output the interfaced data to the audio codec 400.

The mobile SoC 100, namely, the CPU 110 and the other blocks, may enter into the power down mode after the data written to one buffer (for example, the buffer 331) of the buffers included in the memory buffer 330 is transmitted to the audio buffer 121. The audio out module 120 continuously operates during audio playback, and when an amount of data remaining in the audio buffer 121 is less than or equal to the reference value, the audio out module 120 wakes the mobile SoC 100 up. The awakened mobile SoC 100 may repeat the transmission of the audio information from the sound source storage device 200 to the audio buffer 121 and re-enter into the power down mode.

The audio interface 123 may operate in a master mode or a slave mode as will be described later. To this end, the audio interface 123 may include a DMA function.

Figure 4:
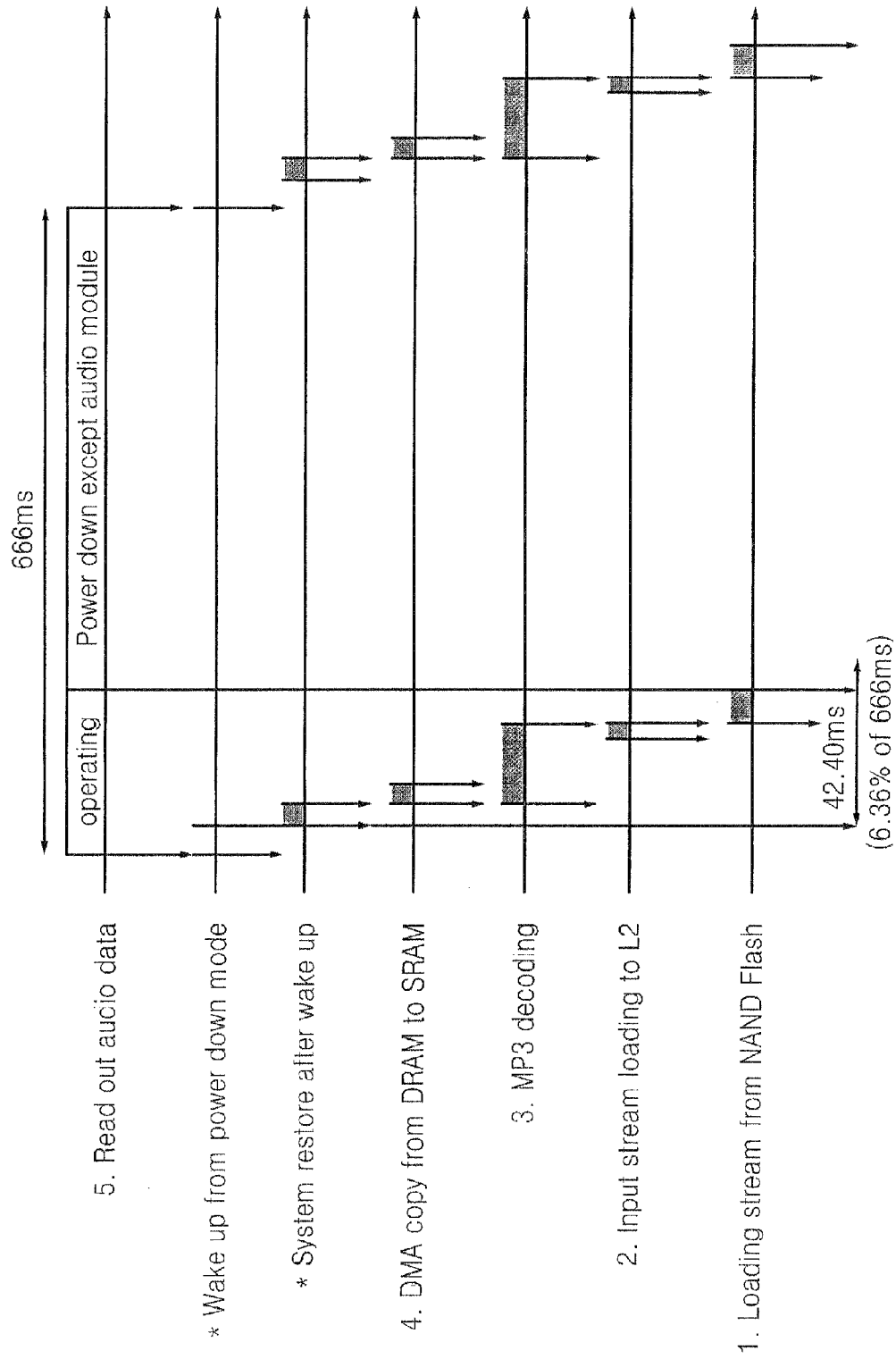
FIG. 4 is a timing diagram of audio playback performed in a low power mode, according to an exemplary embodiment of the present inventive concept.

FIG. 4 is a timing diagram of audio playback performed in a low power mode, according to an exemplary embodiment of the present inventive concept. FIG. 4 illustrates a result of a simulation performed when the audio buffer 121 of the audio out module 120 is 128 KB. First, when the audio out module 120 outputs audio data to the audio codec 400 to achieve audio playback, and data remaining in the audio buffer 121 is less than or equal to the reference value, the audio out module 120 wakes the mobile SoC 100 up. When a restoration period of the awakened mobile SoC 100 ends, the second DMA 500-1 copies the data included in the memory buffer 330 (for example, a DRAM) to the audio buffer 121 (for example, a SRAM). Simultaneously with the copying, the CPU 110 may decode the audio information (for example, the MP3 stream) and write the decoded audio information to the memory buffer 330. In other words, when the memory buffer 330 is implemented as a double buffer, data stored in one buffer (for example, the buffer 333) of the double buffer may be copied to the audio buffer 121, and simultaneously the CPU 110 may write the decoded audio information to the other buffer (for example, the buffer 331) of the double buffer. When the L2 cache 113 is emptied or data loaded in the L2 cache 113 is less than or equal to a certain value, the CPU 110 preloads the audio information stored in the file buffer 310. When the data of the file buffer 310 is preloaded to the L2 cache 113, new audio information may be loaded from the sound source storage device 200 (for example, a NAND flash memory device).

In the simulation of an exemplary embodiment of present inventive concept, a cycle in which the entire audio is played back was 666 ms, and a period of time during which the entire mobile SoC 100 operates was 42.4 ms. In other words, in an audio playback method according to an exemplary embodiment of the present inventive concept, the mobile SoC 100 except for the audio out module 120 may be in the power down mode for about 93% of the entire audio playback period of time. Thus, power consumption may be reduced.

Figure 5:
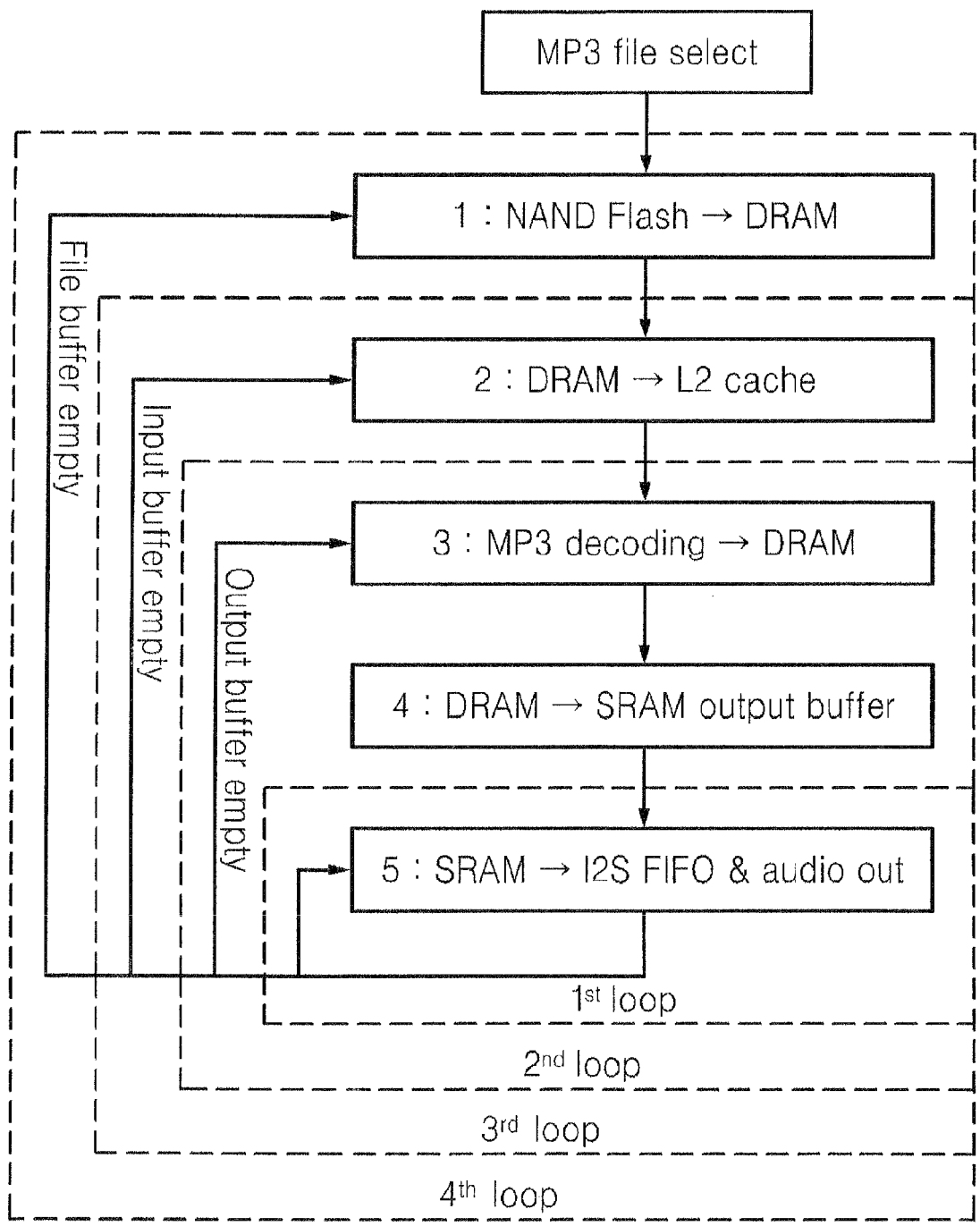
FIG. 5 illustrates control of the flow of a low-power mode audio playback method according to an exemplary embodiment of the present inventive concept.

FIG. 5 illustrates control of the flow of a low-power mode audio playback method according to an exemplary embodiment of the present inventive concept. FIG. 5 illustrates a case where the sound source storage device 200 and the memory device 300 are respectively implemented as a NAND flash memory device and a DRAM, the audio buffer 121 is implemented as a SRAM and the audio interface 123 is implemented as an I2S interface. However, the present inventive concept is not limited to this case.

First, in an initial state where operations 1 through 5 have been performed after a user selects an MP3 file, all buffers (namely, the audio buffer 121 and the memory buffer 330) are fully filled with data. As long as data exists in a FIFO (queue) included in the audio interface 123 (the I2S interface), the audio interface 123 continuously sends the data of the FIFO to the audio codec 400. When the FIFO of the I2S interface 123 is emptied while this sending is being performed, a 1st loop of bringing data from the audio buffer 121 (SRAM) is performed.

When the amount of data remaining in the audio buffer 121 is decreased to be less than or equal to the reference value during the 1st loop, a 2nd loop is performed in which the mobile SoC 100 wakes up to transfer the decoded audio information stored in one buffer (for example, the buffer 331) of the memory buffer 330 of the memory device 300 (DRAM) to the audio buffer 121 via the second DMA 500-1, and simultaneously the CPU 110 decodes the MP3 stream stored in the L2 cache 113 and stores the decoded MP3 stream in the other buffer (for example, the buffer 333) of the memory buffer 330 of the DRAM 300.

When the L2 cache 113 is emptied during the 2nd loop, a 3rd loop of preloading the MP3 stream from the file buffer 310 of the DRAM 300 to the L2 cache 113 is performed. When the file buffer 310 of the DRAM 300 is emptied during the 3rd loop, a 4th loop of loading the MP3 stream from the NAND flash memory device 200 to the file buffer 310 of the DRAM 300 may be performed.

The audio out module 120 may operate according to a clock signal that is asynchronous with a clock signal of the mobile SoC 100, so as to be optimized for a low-power operation. This is so, because the clock signal of the mobile SoC 100 generally has a high frequency, whereas the audio out module 120 can perform audio playback as long as the frequency of the audio out module 120 is synchronized with the frequency of the audio codec 400's clock signal. Accordingly, to reduce power consumption, the frequency of the audio out module 120 may be synchronized with that of the audio codec 400, which is low.

In addition, since the size of the audio out module 120 is small compared with the size of the mobile SoC 100, a clock tree for the audio out module 120 may be included. Then, the clock tree for the audio out module 120 occupies a small space compared with a clock tree for the mobile SoC 100. Thus, power consumption due to a clock tree may be reduced.

Figure 6:
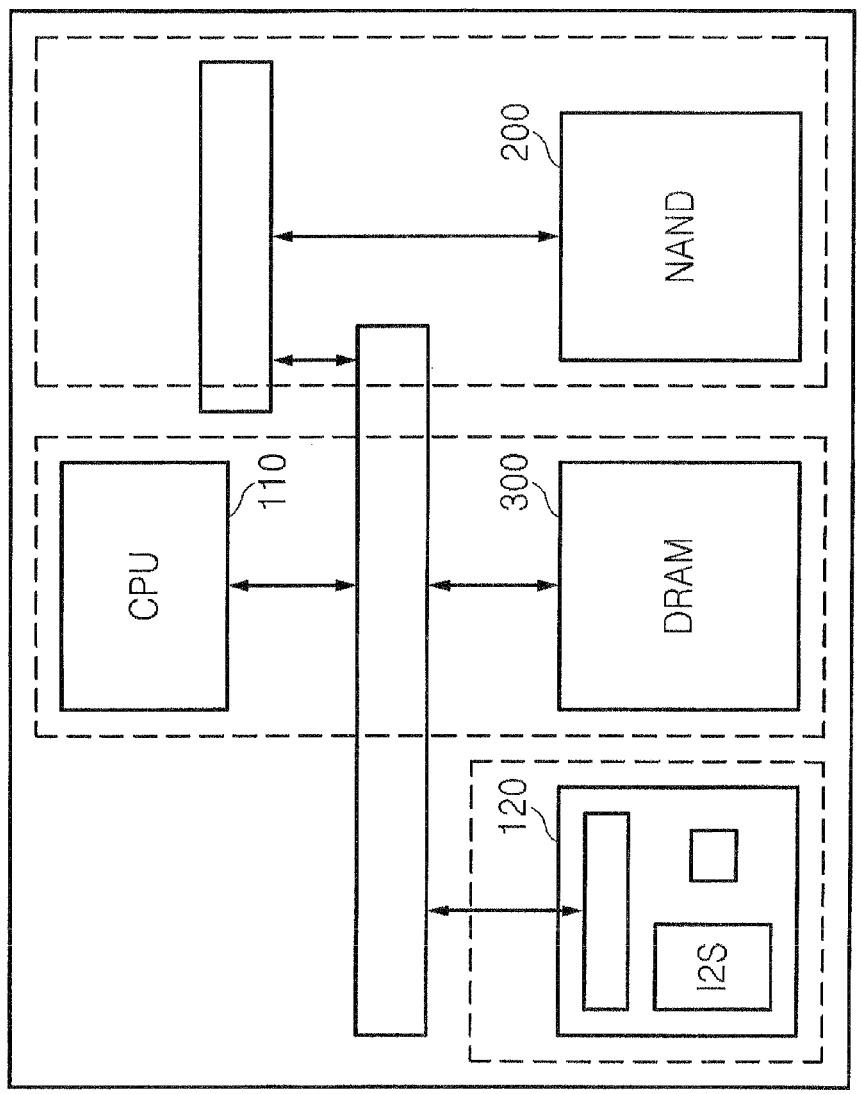
FIG. 6 is a block diagram of a clock structure of the mobile terminal illustrated in FIG. 1.

FIG. 6 is a block diagram of a clock structure of the mobile terminal 1 illustrated in FIG. 1. Referring to FIG. 6, the NAND flash memory device 200 may construct a clock domain, the CPU 110 and the memory device 300 may construct another clock domain, and the audio out module 120 may construct a separate clock domain.

The NAND flash memory device 200 may be operated by a long-path regular voltage threshold (RVT) clock tree, and the CPU 110 and the memory device 300 may be operated by a short-path low voltage threshold (LVT) clock tree. At this time, the audio out module 120 may be operated by a clock tree separate from the short-path LVT clock tree for the CPU 110. At this time, the audio out module 120 may be operated by a short-path RVT clock tree. Accordingly, the amount of power leaked by the clock tree corresponding to the audio out module 120 may be small.

As described above, the use of the audio buffer 121, which is relatively large compared with an audio buffer used in a conventional art, to achieve the lower-power mode audio playback method of FIG. 5 may incur a high cost. Accordingly, the audio buffer 121 may be shared by the audio out module 120 and the other modules of the mobile SoC 100 or used as a general memory to increase the efficiency of resources. In this case, to increase the security of data stored in the audio buffer 121, an address shuffle of the audio buffer 121, a data shuffle thereof, or both of them may be changed. In other words, the address shuffle, the data shuffle, or both of them may be different when the audio buffer 121 is used by the audio out module 120 from when the audio buffer 121 is used by the other modules (for example, a camera module).

Figure 7:
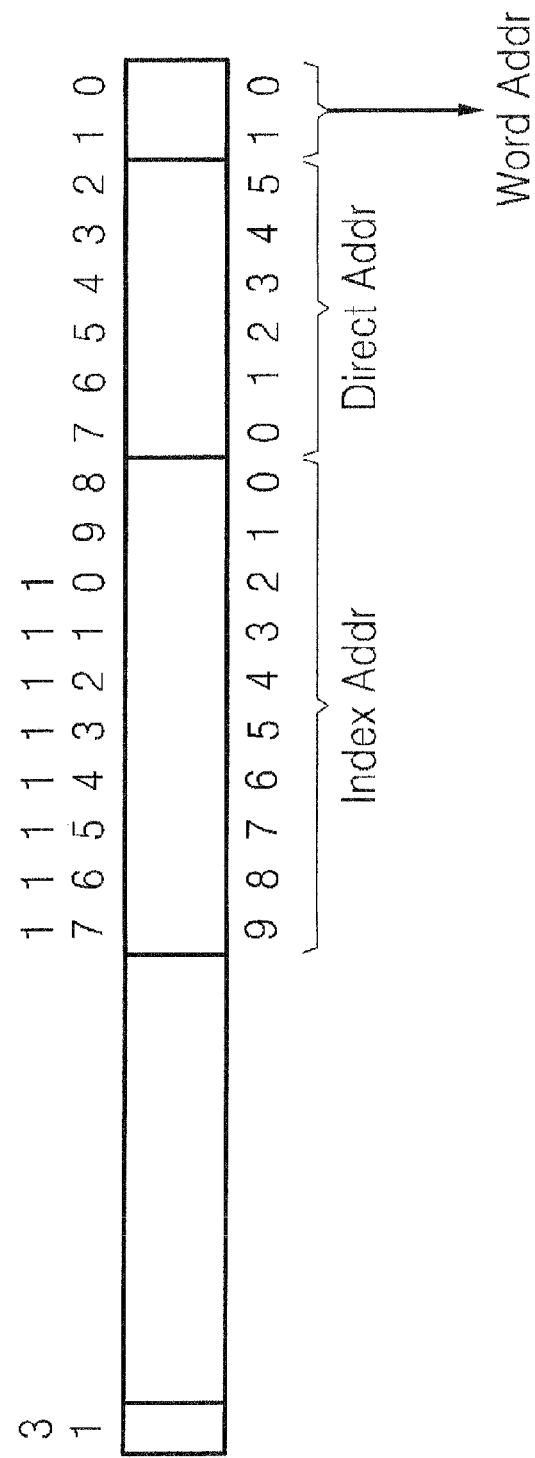
FIG. 7 is a diagram for explaining a method for increasing the security of an audio buffer included in the mobile terminal illustrated in FIG. 1, according to an exemplary embodiment of the present inventive concept.

FIG. 7 is a diagram for explaining a method for increasing the security of the audio buffer 121, according to an exemplary embodiment of the present inventive concept. Referring to FIG. 7, when the audio buffer 121 is used by the audio out module 120, addresses 0 through 9 may be sequentially allocated to the audio buffer 121. However, when the audio buffer 121 is used by the other modules (for example, the camera module), some lowermost bits are used as word addresses, some of the next lowermost bits represent direct addresses, and some bits next to the some next lowermost bits represent index addresses, as illustrated in FIG. 7. In this way, an address mapping method different from that used in the audio out module 120 may be used when the audio buffer 121 is used by the other modules (for example, the camera module).

Alternatively, a data shuffle instead of such an address shuffle may be changed. For example, when the audio buffer 121 is used by the audio out module 120, the data shuffle of data [0:31] is sequential. On the other hand, as illustrated in FIG. 7, when the audio buffer 121 is used by the other modules, the data shuffle is not sequential, and data may be used in a predetermined sequence.

The address mapping method and/or the data shuffle as illustrated in FIG. 7 may vary. A reason why the CPU 110 writes decoded audio information to the memory buffer 330 and then transfers the decoded audio information to the audio buffer 121 via the second DMA 500-1 instead of writing the decoded audio information directly to the audio buffer 121 is to share the audio buffer 121 with the other modules.

For example, if the audio buffer 121 is shared with a camera interface of the mobile SoC 100, the mobile terminal 1 may operate as follows. First, when the mobile terminal 1 initially enters into a low-power audio playback mode according to an exemplary embodiment of the present inventive concept, the CPU 110 does not write decoded audio information to the audio buffer 121 but writes the decoded audio information to the memory buffer 330. The audio interface 123 may be in the slave mode to receive data from the memory buffer 330 via the second DMA 500-1.

At this time, the second DMA 500-1 may access a location from which final data has been transmitted from the memory buffer 330, and switch the audio buffer 121 from a memory for a camera interface to a memory for the audio out module 120. The second DMA 500-1 may transfer data stored in the memory buffer 330, starting from data next to data corresponding to the accessed location, to the audio buffer 121. Thereafter, the audio interface 123 may be switched to the master mode, and the audio interface 123 in the master mode may read data from the audio buffer 121 and output the read-out data to the audio codec 400.

Then, when the mobile terminal 1 enters back into a general audio playback mode (for example, when an external input by a user occurs during MP3 playback), if the audio interface 123 finishes its operation in the master mode, the master mode of the audio interface 123 is disabled, and the audio interface 123 notifies the second DMA 500-1 of information about a final address read out by the audio interface 123. Then, the audio interface 123 is switched to the slave mode, the second DMA 500-1 is enabled, and the audio buffer 121 is switched to the memory for a camera interface. Thereafter, the second DMA 500-1 accesses a location corresponding to the final address from the memory buffer 330 and allows data stored in a location next to the accessed location to start being transmitted to the audio interface 123.

Then, when the mobile terminal 1 re-enters into the low-power audio playback mode (for example, the mobile terminal 1 re-enters into the low-power audio playback mode after an operation requested by the user is finished), the audio buffer 121 is switched from the memory for camera interfaces to the memory for the audio out module 120, and after an operation of the second DMA 500-1 is completed, the audio interface 123 is switched to the master mode, so that audio is played back according to the low-power mode audio playback method according to an exemplary embodiment of present inventive concept.

As described above, the audio interface 123 may include a DMA function to enter into a slave mode dependent on an external DMA or into a master mode where data input and output is performed independently.

Figure 8:
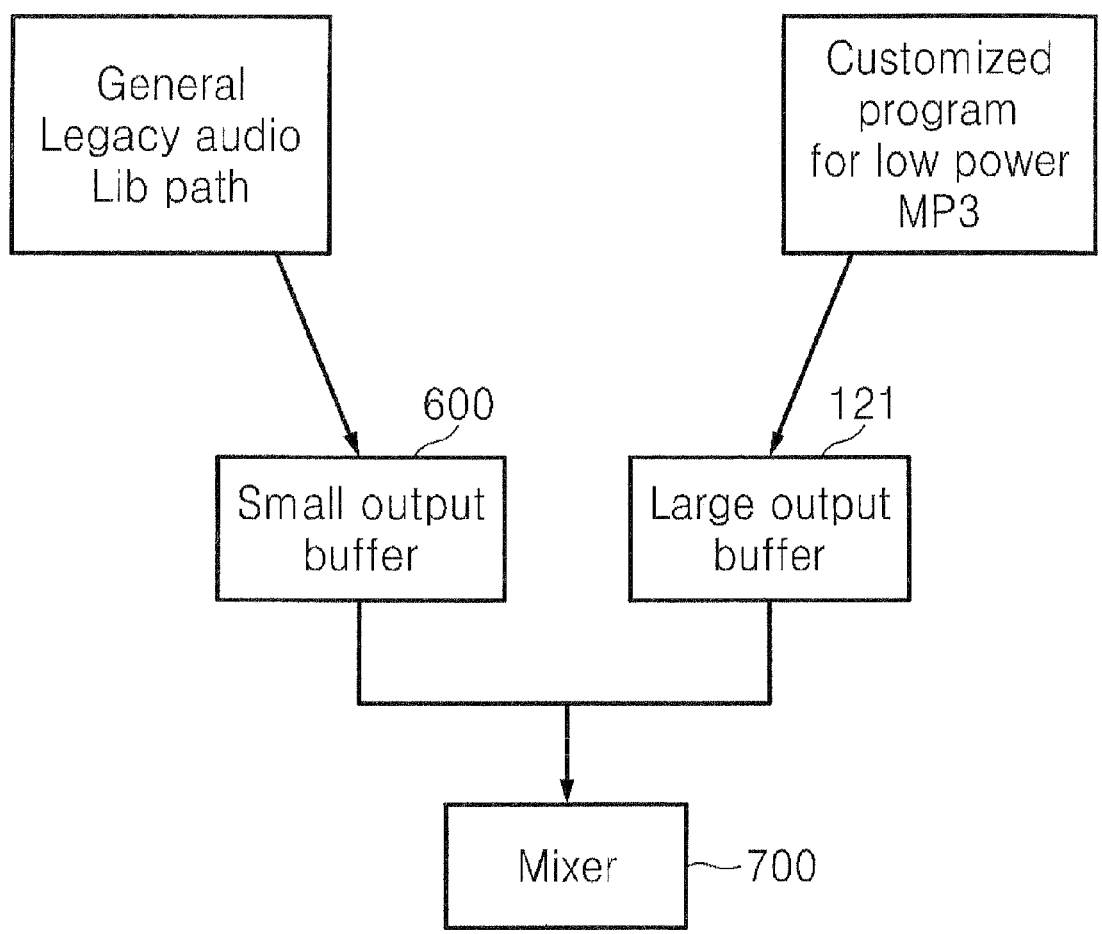
FIG. 8 is a block diagram for explaining audio mixing performed in the mobile terminal illustrated in FIG. 1, according to an exemplary embodiment of the present inventive concept.

FIG. 8 is a block diagram for explaining audio mixing performed in the mobile terminal 1 illustrated in FIG. 1, according to an exemplary embodiment of the present inventive concept. Referring to FIG. 8, if the mobile terminal 1 is driven by an open operating system (OS) (for example, Windows or Linux), a general audio flow (namely, a legacy audio library path) previously set by the open OS may be implemented in the mobile terminal 1. Acoustic information (for example, a button sound, etc.) of the general audio flow may be temporarily stored in an output buffer 600 included in the mobile terminal 1. A custom player for the low-power audio playback mode according to an exemplary embodiment of the present inventive concept may be further implemented and included in the mobile terminal 1. As described above, audio information of the custom player may be stored in the audio buffer 121, which is relatively large compared with a conventional one. Accordingly, the mobile terminal 1 may include a hardware mixer 700 and mix the acoustic information with audio information which is to be output as a result of the low-power audio playback mode, and thus output the mixture to the audio interface 123.

A low-power audio reproducing method according to an exemplary embodiment of the present inventive concept can also take the form of a computer program product embodied in one or more computer readable recording medium(s) having computer readable codes embodied thereon. The computer readable recording medium may be any data storage device that can store data which can be thereafter read by a computer system. Examples of the computer readable recording medium include a read-only memory (ROM), a random-access memory (RAM), a portable compact disk read-only memory (CD-ROM), a magnetic storage device, a portable computer diskette, an optical storage device, etc. The computer readable recording medium can also be distributed over a network of coupled computer systems so that the computer readable code is stored and executed in a distributed fashion. In addition, functional programs, codes, and code segments for accomplishing the present inventive concept can be written in any combination of one or more programming languages.

According to an exemplary embodiment of the present inventive concept, there is provided an audio out module, which includes minimum logic for audio output, and which can be supplied with power independently from a mobile SoC. Therefore, in an exemplary embodiment, only the audio out module can be operated when the mobile SoC is powered down, and thus power consumption may be reduced. In addition, since a relatively large memory buffer is included in the audio out module the memory buffer may be used by other components of the mobile SoC, thereby increasing the efficiency of resource utilization. Moreover, an address and/or data shuffling method in accordance with an exemplary embodiment of the present inventive concept, which changes shuffling patterns for different uses of the audio out module's memory buffer, can increase the security of a mobile terminal including the mobile SoC.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

What is claimed is:

1. A mobile terminal, comprising:
a mobile System on Chip (SoC) configured to wake up in response to data remaining in an audio buffer of an audio out module being less than or equal to a reference value,
the mobile SoC including a central processing unit (CPU) configured to decode data stored in a first cache of the CPU and write the decoded data to the audio buffer,
the mobile SoC including a memory device that includes a file buffer, the mobile SoC configured to load data stored in the file buffer of the memory device to a second cache of the CPU,
the mobile terminal further comprising a sound storage device configured to load new data to the file buffer of the memory device,
the mobile SoC configured to power down a plurality of its components except for the audio out module in response to the completion of the loading of new data, and
the mobile SoC configured to operate the audio out module to provide audio playback while the plurality of components are powered down,
wherein a power mode of the audio out module is controlled separately from a power mode of the mobile SoC so that the audio out module operates when the mobile SoC is in a power down mode.

* * * * *